United States Patent
Li

(10) Patent No.: US 11,719,251 B2
(45) Date of Patent: Aug. 8, 2023

(54) FAN CONTROL SYSTEM, METHOD AND SERVER WHEREIN PWM PIN AND TACH PIN ARE UTILIZED TO CONTROL A FAN BASED ON A MODE CONTROL INSTRUCTION

(71) Applicant: INSPUR SUZHOU INTELLIGENT TECHNOLOGY CO., LTD, Jiangsu (CN)

(72) Inventor: Yong Li, Jiangsu (CN)

(73) Assignee: INSPUR SUZHOU INTELLIGENT TECHNOLOGY CO., LTD, Jiangsu (CN)

(*) Notice: Subject to any disclaimer, the term of this patent is extended or adjusted under 35 U.S.C. 154(b) by 213 days.

(21) Appl. No.: 17/281,592

(22) PCT Filed: Jul. 31, 2019

(86) PCT No.: PCT/CN2019/098547
§ 371 (c)(1),
(2) Date: Mar. 31, 2021

(87) PCT Pub. No.: WO2020/224067
PCT Pub. Date: Nov. 12, 2020

(65) Prior Publication Data
US 2021/0396239 A1      Dec. 23, 2021

(30) Foreign Application Priority Data
May 9, 2019     (CN) .......................... 201910384769.0

(51) Int. Cl.
G06F 1/20      (2006.01)
F04D 27/00     (2006.01)
G05B 19/045    (2006.01)

(52) U.S. Cl.
CPC .......... *F04D 27/008* (2013.01); *G05B 19/045* (2013.01); *G06F 1/206* (2013.01); *G05B 2219/25268* (2013.01)

(58) Field of Classification Search
CPC ...................................... G06F 1/206
See application file for complete search history.

(56) References Cited

U.S. PATENT DOCUMENTS 6,381,406 B1    4/2002  Smith et al.
9,207,732 B1   12/2015  Chen et al.
(Continued)

FOREIGN PATENT DOCUMENTS

CN      1767354 A     5/2006
CN    101964540 A     2/2011
(Continued)

OTHER PUBLICATIONS

International Search Report for PCT/CN2019/098547 dated Feb. 18, 2020, ISA/CN.

*Primary Examiner* — Suresh Suryawanshi
(74) *Attorney, Agent, or Firm* — Yue (Robert) Xu; Apex Attorneys at Law, LLP

(57) ABSTRACT

A system for controlling a fan is provided, which includes a processor, a driver, a power supply module, an instruction output module and a level control module. The power supply module is configured to supply power to the level control module when the server is started up and when the server is shut down. The instruction output module is configured to output a mode control instruction. The level control module is configured to output a first level to the PWM pin and output a second level to the TACH pin based on the mode control instruction and then control the power supply module to supply power to the processor and the driver. The processor is configured to determine a mode of the fan based (Continued)

on the first level and the second level and control a rotation speed of the fan based on the mode of the fan.

11 Claims, 1 Drawing Sheet

(56) References Cited

U.S. PATENT DOCUMENTS

| | | | |
|---|---|---|---|
| 2004/0230845 A1* | 11/2004 | Su | G06F 1/206 |
| | | | 713/300 |
| 2012/0041614 A1 | 2/2012 | Chang et al. | |
| 2012/0080946 A1 | 4/2012 | Peng | |
| 2013/0044399 A1 | 2/2013 | Wu | |
| 2014/0115348 A1* | 4/2014 | Sun | G06F 1/3287 |
| | | | 713/300 |
| 2020/0192444 A1* | 6/2020 | Lei | G06F 11/3058 |

FOREIGN PATENT DOCUMENTS

| | | | | | |
|---|---|---|---|---|---|
| CN | 102261343 | A | | 11/2011 | |
| CN | 102445977 | A | | 5/2012 | |
| CN | 102955718 | A | | 3/2013 | |
| CN | 104731297 | A | | 6/2015 | |
| CN | 104750627 | A | | 7/2015 | |
| CN | 106194806 | A | | 12/2016 | |
| CN | 106593928 | A | * | 4/2017 | ........... F04D 27/001 |
| CN | 107218243 | A | | 9/2017 | |
| CN | 107420336 | A | * | 12/2017 | ........... F04D 27/004 |
| CN | 207195268 | U | | 4/2018 | |
| CN | 108880761 | A | * | 11/2018 | ........... F04D 27/004 |
| CN | 109026809 | A | | 12/2018 | |
| CN | 109595192 | A | | 4/2019 | |
| CN | 109618546 | A | * | 4/2019 | |

* cited by examiner

FAN CONTROL SYSTEM, METHOD AND SERVER WHEREIN PWM PIN AND TACH PIN ARE UTILIZED TO CONTROL A FAN BASED ON A MODE CONTROL INSTRUCTION

The present application is the national phase of International Application No. PCT/CN2019/098547, titled "FAN CONTROL SYSTEM, METHOD AND SERVER", filed on Jul. 31, 2019, which claims priority to Chinese Patent Application No. 201910384769.0, titled "FAN CONTROL SYSTEM, METHOD AND SERVER", filed on May 9, 2019 with the Chinese Patent Office, which are incorporated herein by reference in their entireties.

FIELD

The present disclosure relates to the field of fan control technologies, and in particular to a system and a method for controlling a fan, and a server.

BACKGROUND

A server is usually provided with a fan and a system for controlling the fan for dissipating heat generated during operation. The system for controlling the fan includes a processor and a driver. The processor has four pins, which are a power supply pin, a grounded pin, a PWM pin (for controlling a rotation speed of the fan) and a TACH pin (for reading the rotation speed of the fan). Functions of these pins correspondence between PWM signals and rotation speeds of the fan are determined before the fan leaves a factory. PWM signals with different duty ratios correspond to different rotation speeds.

In the conventional technologies, the fan is controlled in a single mode, that is, the fan is controlled only in a case that the server is started up. In a case that the server is shut down, the processor does not receive the PWM signal, which may be understood as the processor receiving a PWM signal with a duty ratio of 0. A power supply module in the server does not supply power to the processor and the driver. In this case, the fan does not operate. However, some devices in the server, such as a network card and a CPLD (Complex Programmable Logic Device) still operate, and the network card generates a large amount of heat during operation. In this case, the heat generated by the network card cannot be effectively dissipated because the fan does not operate, reducing reliability and security of the server.

SUMMARY

An object of the present disclosure is to provide a system and a method for controlling a fan, and a server that have good applicability and high universality, so as to control a rotation speed of the fan in a case that the server is started up, and control the fan to rotate in a case that the server is shut down, thereby ensuring that heat generated by a device such as a network card that operates when the server is in a shut-down state is dissipated, and improving reliability and security of the server.

In order to solve the above technical problems, a system for controlling a fan is provided according to the present disclosure. The system is applied to a server. The system includes a processor, a driver, a power supply module, an instruction output module and a level control module. The power supply module is configured to supply power to the level control module when the server is started up and when the server is shut down. The instruction output module is configured to output a mode control instruction, where the mode control instruction includes a start-up mode instruction and a shut-down mode instruction.

The level control module is connected with the instruction output module, the power supply module, a PWM pin and a TACH pin of the processor and is configured to, on reception of the mode control instruction, output a first level to the PWM pin and output a second level to the TACH pin based on the mode control instruction and then control the power supply module to supply power to the processor and the driver.

The processor is configured to, after being powered on, determine a mode of the fan based on the first level and the second level and control a rotation speed of the fan through the driver and based on the mode of the fan.

Preferably, the level control module is configured to, on reception of the start-up mode instruction or the shut-down mode instruction, output the first level with a first predetermined duration to the PWM pin, output the second level with the first predetermined duration to the TACH pin, and control the power supply module to supply power to the processor and the driver in a process of outputting the first level and the second level.

Preferably, the level control module is configured to, on reception of the shut-down mode instruction, continuously output the first level to the PWM pin and output the second level to the TACH pin and control the power supply module to supply power to the processor and the driver after outputting the first level to the PWM pin and outputting the second level to the TACH pin.

Preferably, the mode of the fan includes a start-up normal rotation mode, a first shut-down rotation mode corresponding to a first rotation speed, a second shut-down rotation mode corresponding to a second rotation speed and a third shut-down rotation mode corresponding to a third rotation speed.

Preferably, the instruction output module comprises a power key corresponding to the start-up normal rotation mode and keys respectively corresponding to the first shut-down rotation mode, the second shut-down rotation mode, and the third shut-down rotation mode.

Preferably, the level control module is a CPLD.

Preferably, the system further includes a first switch, a pull-up resistor, a second switch, and a pull-down resistor.

A control terminal of the first switch is connected with a pin of the CPLD for outputting the first level, a first terminal of the first switch is connected with a first terminal of the pull-up resistor and the PWM pin, a second terminal of the first switch is grounded.

A second terminal of the pull-up resistor is connected with the power supply module.

A control terminal of the second switch is connected with a pin of the CPLD for outputting the second level, a first terminal of the second switch is connected with the power supply module, a second terminal of the second switch is connected with the TACH pin and a first terminal of the pull-down resistor.

A second terminal of the pull-down resistor is grounded.

In order to solve the above technical problems, a method for controlling a fan is further provided according to the present disclosure. The method is applied to the above system for controlling a fan and includes:

outputting, by the instruction output module, the mode control instruction, where the mode control instruction comprises the start-up mode instruction and the shut-down mode instruction;

outputting, by the level control module on reception of the mode control instruction, the first level and the second level to the PWM pin and the TACH pin respectively based on the mode control instruction and then controlling, by the level control module, the power supply module to supply power to the processor and the driver; and determining, by the processor, the mode of the fan based on the first level and the second level and controlling, by the processor, the rotation speed of the fan based on the mode of the fan, after the processor is powered on.

In order to solve the above technical problems, a server is further provided according to the present disclosure. The server includes a fan and the above system for controlling a fan.

A system for controlling a fan is provided according to the present disclosure. The system includes a processor, a driver, a power supply module and an instruction output module configured to output a mode control instruction. The mode control instruction includes a start-up mode instruction and a shut-down mode instruction. The power supply module supplies power to the level control module when the server is started up and when the server is shut down. The level control module, on reception of the mode control instruction, outputs levels to a PWM pin and a TACH pin of the processor based on the mode control instruction and then controls the power supply module to supply power to the processor and the driver. The processor, after being powered on, determines a mode of the fan based on levels of the PWM pin and the TACH pin, so as to control a rotation speed of the fan based on the mode of the fan. As can be seen from the above, the system for controlling a fan controls a single fan in diversified modes, so as to achieve good applicability and high universality and reduce cost. In addition, a rotation speed of the fan can be controlled normally when the server is started up, and the fan can be controlled to rotate when the server is shut down, to ensure dissipation of heat generated by a device such as a network card that operates when the server is in a shut-down state, thereby improving reliability and security of the server.

A method for controlling a fan, and a server are further provided according to the present disclosure. The method and the server have the same beneficial effect as the above system for controlling a fan.

BRIEF DESCRIPTION OF THE DRAWINGS

In order to clearly describe the technical solutions in the embodiments of the present disclosure or the technical solutions in the conventional technologies, drawings to be used in the descriptions of the embodiments or the conventional technologies are briefly described hereinafter. It is apparent that the drawings described below show merely the embodiments of the present disclosure, and those skilled in the art may obtain other drawings according to the provided drawings without any creative effort.

DETAILED DESCRIPTION OF THE EMBODIMENTS

A core of the present disclosure is to provide a system and a method for controlling a fan, and a server that have good applicability and high universality, so as to control a rotation speed of the fan when the server is in a start-up state and control the fan to rotate when the server is in a shut-down state, thereby ensuring that heat generated by a device such as a network card that operates when the server is in the shut-down state is dissipated and improving reliability and security of the server.

In order to make objects, technical solutions and advantages of the embodiments of the present disclosure more clear, technical solutions of the embodiments of the present disclosure are clearly and completely described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Figure 1:
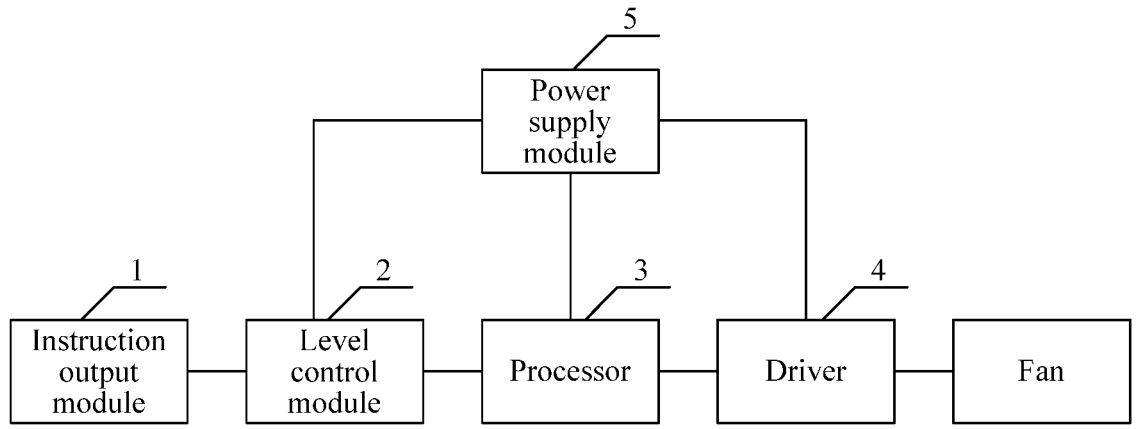
FIG. 1 is a schematic structural diagram of a system for controlling a fan according to the present disclosure.

Reference is made to FIG. 1, which is a schematic structural diagram of a system for controlling a fan according to the present disclosure. The system is applied to a server. The system includes a processor 3, a driver 4, a power supply module 5, an instruction output module 1, and an instruction output module 2. The power supply module 5 supplies power to the instruction output module 2 when the server is started up and when the server is shut down. The instruction output module 1 is configured to output a mode control instruction. The mode control instruction includes a start-up mode instruction and a shut-down mode instruction.

The instruction output module 2 is connected with the instruction output module 1, the power supply module 5, a PWM pin and a TACH pin of the processor 3. The level control module 2 is configured to, on reception of a mode control instruction, output a first level to the PWM pin and output a second level to the TACH pin based on the mode control instruction, and then control the power supply module 5 to supply power to the processor 3 and the driver 4.

The processor 3 is configured to, after being powered on, determine a mode of the fan based on the first level and the second level and control a rotation speed of the fan through the driver 4 based on the mode of the fan.

The present disclosure takes into consideration that in the conventional technologies, the fan rotates only when the server is started up, and that for some servers, some devices in the serves such as network cards still operate and generate heat when the server is shut down (it should be noted that shutting down of the server does not mean that the entire server is powered off). In order to dissipate the heat and improve stability and reliability of the server, it is required to control the fan to rotate according to needs when the server is shut down.

The fan rotates when the following two conditions are both met: 1) the processor 3 and the driver 4 are supplied with power; and 2) the processor 3 outputs a control signal. In the conventional technologies, in a case that the server is shut down, the processor 3 and the driver 4 are powered off and a duty ratio of a PWM signal received by the processor 3 is equal to 0, and the fan does not rotate. In the present disclosure, in order to control the fan to rotate in a case that the server is started up and in a case that the server is shut down, in addition to the processor 3 and the driver 4, the system for controlling a fan further includes the instruction output module 1, the power supply module 5 and the instruction output module 2.

The instruction output module 1 is configured to output a mode control instruction. The mode control instruction includes a start-up mode instruction and a shut-down mode instruction. It is understood that the start-up mode instruction causes the fan operates normally when the server is started up, in the same process as that in the conventional technologies: the processor 3 receives a PWM signal sent by a mainboard of the server and controls the fan to rotate based on a duty ratio of the PWM signal and through the driver 4. The shut-down mode instruction is used for controlling the fan in a predetermined mode of the fan through the driver 4 when the server is shut down. In this case, a rotation speed of the fan may be determined according to actual needs. That is, different level combinations respectively corresponding to different rotation speeds may be set in advance.

The power supply module 5 is configured to supply power to the instruction output module 2 all the time (in a case that the server is started up and in a case that the server is shut down) and supply power to the processor 3 and the driver 4 at a time period as controlled by the instruction output module 2. The power supply module 5 includes a main power source (usually 12V) in the server, a conversion module (for adapting voltages to different devices as required) and switches. The instruction output module 2 controls whether the power supply module 5 supplies power to a device by controlling on and off of a switch between the conversion module and the device.

On reception of the mode control instruction, the instruction output module 2 performs outputs based on the mode control instruction. The instruction output module 2 outputs the first level to the PWM pin and outputs the second level to the TACH pin based on the mode control instruction, and then controls the power supply module 5 to supply power to the processor 3 and the driver 4. The instruction output module 2 outputs the levels to the PWM pin and TACH pin before controlling the processor 3 and the driver 4 to be powered on since the processor 3 determines the levels of the PWM pin and the TACH pin after being powered on and determine the mode of the fan based on the levels of the PWM pin and the TACH pin. Whether the processor 3 stops outputting levels to the PWM pin and the TACH pin after the processor 3 determines the mode of the fan is determined based on the mode control instruction. If the mode control instruction is the start-up control instruction, the processor 3 stops outputting the first level to the PWM pin and stops outputting the second level to TACH pin after the processor 3 determines the mode of the fan, such that the mainboard of the server normally outputs a PWM signal to the PWM pin, and reads a rotation speed of the fan through the TACH pin so as to adjust the PWM signal outputted to the processor 3 based on the rotation speed of the fan, thereby realizing a closed-loop control. If the mode control instruction is the shut-down control instruction, after the processor 3 determines the mode of the fan, the processor 3 may be controlled to stop outputting the first level to the PWM pin and stop outputting the second level to the TACH pin, or the processor 3 may continue outputting the first level to the PWM pin and output the second level to the TACH pin, which may be set depending on actual conditions.

In addition, it should be noted that in the present disclosure, the processor 3 performs a mode determination only immediately after being powered on. After the determination is completed, the mode determination is not performed during a subsequent process of controlling the fan, such that the PWM pin and the TACH pin that are used in the above mode determination are released, which is beneficial since in the start-up mode, the PWM pin and TACH pin perform their original functions in a process of controlling the fan.

A level may be a high level or a low level, therefore, level combinations of the PWM pin and the TACH pin may be set to correspond to four modes. For example, 00 corresponds to a normal operation mode, 01 corresponds to a mode in which the fan rotates at a rotation speed of 5000 r/min. That is, in case that the processor 3 is powered on and determines that the level combination of the PWM pin and the TACH pin is 00, it is determined that the mode of the fan is a normal operation mode corresponding to the started-up server. In this case, the processor 3 controls the fan in a conventional manner, and the PWM pin and the TACH pin perform their original functions in the process of controlling the fan. In a case that the processor 3 is powered on and determines that the level combination of the PWM pin and the TACH pin is 01, it is determined that the mode of the fan is a shut-down operation mode corresponding to the shut-down server. In this case, the processor 3 controls the fan to rotate at a preset constant rotation speed corresponding to the shut-down operation mode (in the shut-down operation mode, since the mainboard of the server does not output a PWM signal, setting a constant speed may simplify a control process of the processor 3, and a constant rotation speed is sufficient to dissipate heat due to the small number of devices operate when the server is shut down.

As described above, the system for controlling a fan controls a single fan in diversified modes, so as to achieve good applicability and high universality and reduce cost. In addition, a rotation speed of the fan can be controlled normally when the server is started up, and the fan can be controlled to rotate when the server is shut down, to ensure dissipation of heat generated by a device such as a network card that operates when the server is shut down, thereby improving reliability and security of the server.

Based on the above embodiments, the following embodiments are provided.

As a preferred embodiment, the instruction output module 2 is configured to, on reception of the start-up mode instruction or the shut-down mode instruction, output the first level with a first predetermined duration to the PWM pin and output the second level with the first predetermined duration to the TACH pin, and control the power supply module 5 to supply power to the processor 3 and the driver 4 in a process of outputting the first level and the second level.

As a preferred embodiment, the instruction output module 2 is configured to continuously output the first level to the PWM pin and output the second level to the TACH pin on reception of the shut-down mode instruction and control the power supply module 5 to supply power to the processor 3 and the driver 4 after outputting the first level to the PWM pin and outputting the second level to the TACH pin.

As can be seen from the above embodiment, when the server operates normally in a start-up state, the mainboard of the server outputs the PWM signal to the PWM pin of the processor 3, and reads the rotation speed of the fan from the TACH pin of the processor 3 so as to adjust the PWM signal outputted to the processor 3 based on the rotation speed of the fan, thereby realizing a closed-loop control. Therefore, the pin instruction output module 2 is required to stop outputting the first level to the PWM and stop outputting the second level to the TACH pin after the processor 3 determining the mode of the fan.

The instruction output module 2 outputs the first level with the first predetermined duration to the PWM pin and outputs the second level with the first predetermined duration to the TACH pin on reception of the start-up mode instruction, and controls the power supply module 5 to supply power to the processor 3 and the driver 4 in the process of outputting the first level and the second level. The predetermined duration herein is required to be greater than a sum of a duration required for the processor 3 to be powered on and a duration required by the processor 3 to perform the mode determination. A short period of time is generally required for the processor 3 to be powered on and perform the mode determination. Therefore, the predetermined duration herein may be set to be 1 second or 2 seconds. Apparently, the predetermined duration may set to be other values, and a value of the predetermined duration is not limited in the present disclosure.

In addition, as mentioned in the above embodiments, in the present disclosure, the process 3 performs a mode determination only immediately after being powered on. After the determination is completed, the mode determination is not performed during the subsequent process of controlling the fan. Moreover, in the present disclosure, in the shut-down mode, the processor 3 controls the fan to rotate at a constant speed. In this case, the PWM pin and the TACH pin are not used. Therefore, the instruction output module 2 outputs the first level to the PWM pin and output the second level to the TACH pin on reception of the shut-down mode instruction, and then controls the power supply module 5 to supply power to the processor 3 and the driver 4, such that the processor 3 performs the mode determination through the PWM pin and the TACH pin. After the processor 3 determines the mode of the fan, the instruction output module 2 may stop outputting the first level to the PWM pin and stop outputting the second level to the TACH pin, or the instruction output module 2 continue outputting the first level to the PWM pin and outputting the second level to the TACH pin, which depends on actual conditions.

As a preferred embodiment, a mode of the fan includes a start-up normal rotation mode, a first shut-down rotation mode corresponding to a first rotation speed, a second shut-down rotation mode corresponding to a second rotation speed and a third shut-down rotation mode corresponding to a third rotation speed.

As described above, levels of the PWM pin and the TACH pin may have four combinations including 00, 01, 11 and 10, which respectively correspond to the start-up normal rotation mode, the first shut-down rotation mode corresponding to the first rotation speed, the second shut-down rotation mode corresponding to the second rotation speed and the third shut-down rotation mode corresponding to the third rotation speed. The first rotation speed, the second rotation speed and the third rotation speed may be set to be different to meet servers from different manufacturers and with different types, which improves applicability and universality.

The first rotation speed, the second rotation speed and the third rotation speed herein are not limited in the present disclosure and are determined based on actual conditions.

As a preferred embodiment, the instruction output module 1 includes a power key corresponding to the start-up normal rotation mode and keys respectively corresponding to the first shut-down rotation mode, the second shut-down rotation mode and the third shut-down rotation mode.

In a case that a user presses the power key, the instruction output module 2 receives a start-up normal rotation mode signal, and outputs the first level to the PWM pin and output the second level to the TACH pin, the first level and the second level corresponding to the start-up signal. In a case that the user presses a first key, the instruction output module 2 receives a first shut-down rotation mode signal, and outputs the first level to the PWM pin and output the second level to the TACH pin, that the first level and the second level corresponding to the first shut-down rotation mode signal. In a case that the user presses a second key, the instruction output module 2 receives a second shut-down rotation mode signal, and outputs the first level to the PWM pin and output the second level to the TACH pin, the first level and the second level corresponding to the second shut-down rotation mode signal. In a case that the user presses a third key, the instruction output module 2 receives a third shut-down rotation mode signal, and outputs a first level to the PWM pin and output a second level to the TACH pin, that the first level and the second level corresponding to the third shut-down rotation mode signal.

In addition, in practical applications, one or more keys may be provided for the user according to actual needs, which further improves applicability and universality.

As a preferred embodiment, the instruction output module 2 is a CPLD.

The CPLD herein may be but is not limited to a CPLD already installed in the server. On one hand, the power supply module 5 in the server supplies power to the CPLD when the server is shut down, which meets a condition that in the present disclosure, the power supply module 5 is required to continuously supply power to the instruction output module 2. On the other hand, the CPLD can output a level signal to a switch between the conversion module and a device to control power-on timing of the power supply module 5, which meets a requirement of controlling the power supply module 5 and a requirement of outputting levels to the PWM pin and the TACH pin in the present disclosure. It can be seen that in the embodiment, the CPLD already provided in the server may function as the instruction output module 2 to reduce hardware cost and development cost.

As a preferred embodiment, the system for controlling a fan further includes a first switch, a pull-up resistor, a second switch, and a pull-down resistor.

A control terminal of the first switch is connected with a first level output pin of the CPLD. A first terminal of the first switch is connected with a first terminal of the pull-up resistor and the PWM pin. A second terminal of the first switch is grounded.

A second terminal of the pull-up resistor is connected with the power supply module 5.

A control terminal of the second switch is connected with a second level output pin of the CPLD. A first terminal of the second switch is connected with the power supply module 5. A second terminal of the second switch is connected with the TACH pin and a first terminal of the pull-down resistor.

A second terminal of the pull-down resistor is grounded.

In order to improve driving capability of the level signal outputted by the CPLD, in the present disclosure, the pull-up resistance and the pull-down resistance are arranged at an output terminal of the CPLD, so as to improve the driving capability of the CPLD and improve control reliability and stability of the system for controlling a fan.

Figure 2:
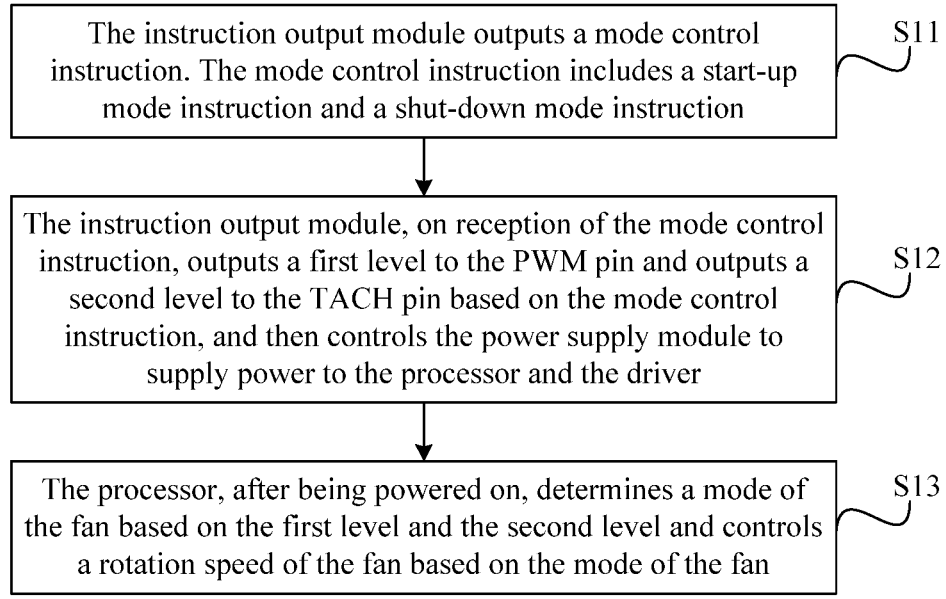
FIG. 2 is a flow chart of a method for controlling a fan according to the present disclosure.

Reference is made to FIG. 2, which is a flow chart of a method for controlling a fan according to the present disclosure. The method is applied to the above system for controlling a fan. The method includes the following steps S11 to S13.

In step S11, the instruction output module 1 outputs a mode control instruction. The mode control instruction includes a start-up mode instruction and a shut-down mode instruction.

In step S12, the instruction output module 2, on reception of the mode control instruction, outputs a first level to the PWM pin and output a second level to the TACH pin based on the mode control instruction, and then controls the power supply module 5 to supply power to the processor 3 and the driver 4.

In step S13, the processor 3, after being powered on, determines a mode of the fan based on the first level and the second level and controls a rotation speed of the fan based on the mode of the fan.

For descriptions of the fan control principle of the method for controlling a fan according to the present disclosure, one may refer to the above system embodiments and the principle is not repeated herein.

A server is further provided according to the present disclosure. The server includes a fan and the above system for controlling a fan.

For descriptions of the fan control principle of the server according to the present disclosure, one may refer to the above system embodiments and the principle is not repeated herein.

It should be noted that in the present disclosure, relational terms such as "first" and "second" are merely used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

With the description of the embodiments disclosed above, those skilled in the art may implement or use the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A system for controlling a fan, wherein the system is applied to a server, and comprises a processor, a driver, a power supply module, an instruction output module and a level control module, wherein the power supply module is configured to supply power to the level control module when the server is started up and when the server is shut down;

the instruction output module is configured to output a mode control instruction, wherein the mode control instruction comprises a start-up mode instruction and a shut-down mode instruction;

the level control module is connected with the instruction output module, the power supply module, a Pulse Width Modulation (PWM) pin and a Tachometer (TACH) pin of the processor and is configured to, on reception of the mode control instruction, output a first level to the PWM pin and output a second level to the TACH pin based on the mode control instruction and then control the power supply module to supply power to the processor and the driver; and the processor is configured to, after being powered on, determine a mode of the fan based on the first level and the second level and control a rotation speed of the fan through the driver and based on the mode of the fan, wherein the level control module is configured to, on reception of the start-up mode instruction or the shut-down mode instruction, output the first level with a first predetermined duration to the PWM pin, output the second level with the first predetermined duration to the TACH pin, and control the power supply module to supply power to the processor and the driver in a process of outputting the first level and the second level.

2. The system for controlling a fan according to claim 1, wherein the mode of the fan comprises a start-up normal rotation mode, a first shut-down rotation mode corresponding to a first rotation speed, a second shut-down rotation mode corresponding to a second rotation speed and a third shut-down rotation mode corresponding to a third rotation speed.

3. The system for controlling a fan according to claim 2, wherein the instruction output module comprises a power key corresponding to the start-up normal rotation mode and keys respectively corresponding to the first shut-down rotation mode, the second shut-down rotation mode, and the third shut-down rotation mode.

4. The system for controlling a fan according to claim 2, wherein the level control module is a Complex Programmable Logic Device (CPLD).

5. The system for controlling a fan according to claim 4, further comprising a first switch, a pull-up resistor, a second switch, and a pull-down resistor, wherein:

a control terminal of the first switch is connected with a pin of the CPLD for outputting the first level, a first terminal of the first switch is connected with a first terminal of the pull-up resistor and the PWM pin, a second terminal of the first switch is grounded;

a second terminal of the pull-up resistor is connected with the power supply module;

a control terminal of the second switch is connected with a pin of the CPLD for outputting the second level, a first terminal of the second switch is connected with the power supply module, a second terminal of the second switch is connected with the TACH pin and a first terminal of the pull-down resistor; and a second terminal of the pull-down resistor is grounded.

6. A method for controlling a fan, applied to a system for controlling a fan, wherein the system is applied to a server, and comprises a processor, a driver, a power supply module, an instruction output module and a level control module, the power supply module is configured to supply power to the level control module when the server is started up and when the server is shut down, and the level control module is connected with the instruction output module, the power supply module, a Pulse Width Modulation (PWM) pin and a Tachometer (TACH) pin of the processor, and the method comprises:

outputting, by the instruction output module, a mode control instruction, wherein the mode control instruction comprises a start-up mode instruction and a shut-down mode instruction;

outputting, by the level control module on reception of the mode control instruction, a first level and a second level to the PWM pin and the TACH pin respectively based on the mode control instruction and then controlling, by the level control module, the power supply module to supply power to the processor and the driver, comprising: outputting, by the level control module on reception of the start-up mode instruction or the shut-down mode instruction, the first level with a first predetermined duration and the second level with the first predetermined duration to the PWM pin and the TACH pin respectively, and controlling, by the level control module, the power supply module to supply power to the processor and the driver in a process of outputting the first level and the second level; and determining, by the processor after being powered on, a mode of the fan based on the first level and the second level and controlling, by the processor, a rotation speed of the fan based on the mode of the fan.

7. A server, comprising a fan and the system for controlling a fan according to claim 1.

8. The method for controlling a fan according to claim 6, wherein the mode of the fan comprises a start-up normal rotation mode, a first shut-down rotation mode corresponding to a first rotation speed, a second shut-down rotation mode corresponding to a second rotation speed and a third shut-down rotation mode corresponding to a third rotation speed.

9. The method for controlling a fan according to claim 8, wherein the instruction output module comprises a power key corresponding to the start-up normal rotation mode and keys respectively corresponding to the first shut-down rotation mode, the second shut-down rotation mode, and the third shut-down rotation mode.

10. The method for controlling a fan according to claim 8, wherein the level control module is a Complex Programmable Logic Device (CPLD).

11. The method for controlling a fan according to claim 10, wherein the server further comprises a first switch, a pull-up resistor, a second switch, and a pull-down resistor, wherein:

a control terminal of the first switch is connected with a pin of the CPLD for outputting the first level, a first terminal of the first switch is connected with a first terminal of the pull-up resistor and the PWM pin, a second terminal of the first switch is grounded;

a second terminal of the pull-up resistor is connected with the power supply module;

a control terminal of the second switch is connected with a pin of the CPLD for outputting the second level, a first terminal of the second switch is connected with the power supply module, a second terminal of the second switch is connected with the TACH pin and a first terminal of the pull-down resistor; and a second terminal of the pull-down resistor is grounded.

* * * * *